(12) United States Patent
Mattice (10) Patent No.: US 11,060,714 B2
(45) Date of Patent: Jul. 13, 2021

(54) COMPACT DEVICE FOR ILLUMINATING BOTTLES

(71) Applicant: Christopher Vaughn Mattice, Vero beach, FL (US)

(72) Inventor: Christopher Vaughn Mattice, Vero beach, FL (US)

( * ) Notice: Subject to any disclaimer, the term of this patent is extended or adjusted under 35 U.S.C. 154(b) by 0 days.

(21) Appl. No.: 16/455,730

(22) Filed: Jun. 27, 2019

(65) Prior Publication Data

US 2020/0158328 A1  May 21, 2020

Related U.S. Application Data

(60) Provisional application No. 62/663,855, filed on Apr. 27, 2018.

(51) Int. Cl.
| | | |
|---|---|---|
| *F21V 33/00* | (2006.01) | |
| *F21V 31/00* | (2006.01) | |
| *B65D 23/00* | (2006.01) | |
| *H05B 45/28* | (2020.01) | |
| *F21W 131/30* | (2006.01) | |
| *F21Y 115/10* | (2016.01) | |
| *H04W 4/80* | (2018.01) | |
| *A47G 19/22* | (2006.01) | |

(52) U.S. Cl.
CPC .......... *F21V 33/0036* (2013.01); *B65D 23/00* (2013.01); *F21V 31/005* (2013.01); *H05B 45/28* (2020.01); *A47G 2019/2238* (2013.01); *B65D 2203/12* (2013.01); *F21W 2131/30* (2013.01); *F21Y 2115/10* (2016.08); *H04W 4/80* (2018.02)

(58) Field of Classification Search
CPC .................................................... F21V 33/0036
USPC ......................................................... 362/267
See application file for complete search history.

(56) References Cited

U.S. PATENT DOCUMENTS

| | | | | |
|---|---|---|---|---|
| 6,254,247 B1* | 7/2001 | Carson | ............... | A47G 19/2227 359/32 |
| 7,419,072 B1* | 9/2008 | Vanella | ............... | A47G 23/0309 222/113 |
| 9,163,826 B1* | 10/2015 | Citrin | ................. | A47G 19/2227 |
| 2002/0159247 A1* | 10/2002 | Katzman | ................ | B65D 23/14 362/101 |
| 2004/0004829 A1* | 1/2004 | Policappelli | ............ | G09F 13/20 362/101 |

(Continued)

*Primary Examiner* — Christopher M Raabe
(74) *Attorney, Agent, or Firm* — Chris Tanner; FYPA PLLC (57) ABSTRACT

The present invention relates to a device for illuminating bottles that fits within and adheres to the naturally occurring concave recess at the bottom of a bottle. The device is intended to be inserted into the cavity and dimensioned to sit flush against a bottle when the device is placed within the concave recess at the bottom of the bottle. Other electrical elements may be included which provide for control of intensity, fluctuations in intensity, and to control power to the device. The device may also contain electrical components to allow wireless control of device and the ability to control device via smartphone. The device further includes an improved means for securing the device in the bottle, while maintaining a water tight seal. The device is intended to be used in conjunction with containers to provide an illumination of the bottle, creating a unique effect for displaying containers.

23 Claims, 11 Drawing Sheets

(56) References Cited

U.S. PATENT DOCUMENTS

| | | | | |
|---|---|---|---|---|
| 2006/0139928 A1* | 6/2006 | Griffiths | ............... | B65D 51/248 |
| | | | | 362/276 |
| 2007/0121317 A1* | 5/2007 | Huang | .................... | F21S 9/037 |
| | | | | 362/183 |
| 2008/0014384 A1* | 1/2008 | Lin | ........................... | F21V 3/00 |
| | | | | 428/34.1 |
| 2008/0035515 A1* | 2/2008 | Dikopf | ............... | A47G 19/2227 |
| | | | | 206/457 |
| 2014/0185277 A1* | 7/2014 | Mongeli | ............ | A47G 19/2227 |
| | | | | 362/157 |
| 2014/0300273 A1* | 10/2014 | LeBrun | .............. | A47G 19/2227 |
| | | | | 315/76 |
| 2017/0343206 A1* | 11/2017 | Hagen | .................... | B65D 23/12 |

\* cited by examiner

COMPACT DEVICE FOR ILLUMINATING BOTTLES

FIELD OF INVENTION

The invention relates generally to a compact illumination device for illuminating bottles, and more particularly, to an improved compact illumination device for illuminating bottles via the concave recess at the bottom of the bottles.

BACKGROUND OF THE INVENTION

Consumer beverage industries are always looking for new ways of distinguishing their bottled products from that of their competitors, or simply just to make such products stand out to potential consumers. The aesthetic and appeal of bottled drink products are critical in determining their commercial success. Manufacturers of bottled drinks often include creative aesthetic features such as unique bottle shapes, bright colors, and fanciful graphic designs and logos in an attempt to attract and maintain consumers. Retailers of bottled drinks also seek to increase the appeal of bottled drinks by displaying drinks in such ways that will catch the consumer's attention.

The use of illumination in displaying bottled drinks is a commonly invoked method of increasing the appeal of bottled drinks. Retailers such as bars and nightclubs often display beverage bottles on custom lighting shelves that illuminate the bottles giving them a glowing appearance to attract consumers and increase visibility of the bottle. Some bars and nightclubs enhance consumer experience by placing or mounting flashlights at the base of their bottles when delivering them to the consumer's table in order to catch the attention of other patrons, and provide the consumers an aesthetically pleasing experience, thereby increasing sales and creating a fun, party atmosphere. However, often, once a bottle is removed from an illuminated shelf, or the server leaves with the flashlight, the bottle is no longer illuminated.

Some solutions have been attempted to provide continuous illumination during a consumer's experience. One method employed is to use a lighted coaster. However, a major flaw of this design is it also change the visual appearance of the bottle and can be seen when the bottle is sitting upright on a table. This previously mentioned device is not incorporated into the bottle and changes the carefully designed contour and aesthetics of bottle. The previously mentioned design also do not provide effective lighting because liquor bottles often have concave bottoms, and this does not allow for optimum distribution and scattering of light. They also do not provide a watertight seal to protect electronics As a result, the bottles are not as efficient in illuminating as they could be. Previous designs also do not incorporate wireless controllability of lighting, allowing users to interact or control the device via smartphone or remote. Previous designs also do not highlight the ability of users to interact with device or control the color of light. There is a need for a means of illuminating bottled drinks that is waterproof, portable, wirelessly controllable, cost effective, and compatible with multiple types of bottles without taking away from the bottle's original aesthetic appeal and function. Other attempts have been made to adhere a small LED light and power supply within the concave portion of the bottle, but these devices often fail because of their inherent design flaws. They are not waterproof, the adhesive or electronics get saturated with water causing the device to fail. Thus there further remains an unmet need for a bottle illuminating device which is wirelessly controllable, is waterproof, does not change the bottles visual appearance plus ability to stand freely, and which does not fall off or fail in normal use in a wet environment.

SUMMARY OF THE INVENTION

An object of this invention is to provide a means of illuminating bottled drinks that is portable, cost effective, and compatible with multiple types of bottles without taking away from the bottle's original aesthetic appeal and function.

Another object of the invention is to provide an illumination device for bottles, which is waterproof, which does not change the appearance of the bottle's when not in use, and which does not fall off or fail in a wet environment.

Embodiments of the device include a light source, a power source, a backing plate, and a switching mechanism or switch to turn the device on and off. The light source may utilize any or a combination of several of a variety of different types of light sources, including but not limited to, LED, SMD LED, RGB LED, incandescent, ultraviolet, and chemical illumination sources. The device may utilize any or a combination of several of a variety of different types of power sources, including but not limited to, batteries, capacitors, Thermal electric generators or a combination thereof.

Further, the backing plate has a circular shape dimensioned to fit within a concave recess at the bottom of a bottle. The backing plate also includes a tapered edge about its periphery that is dimensioned to sit flush against the bottle when the device is placed within the concave recess at the bottom of the bottle. The device is designed to be low profile and fit within the concave recess of the bottle, so that the original aesthetic of the bottle is preserved and the bottle is able to stand upright without any interference from the device. In at least one embodiment, the tapered peripheral edge provides a better contact with the curved recessed edges of the bottle allowing for a watertight seal to be created between the device and the bottle. An adhesive is deposited on the tapered periphery of the backing plate for sealing the backing plate within the concave recess at the bottom of the bottle. The adhesive can permanently and securely attaches the device to the bottle. The tapered design of the backing plate is also functional in increasing the bonding surface area of the backing plate and bottle to provide a more secure fit to prevent device from falling out.

In some embodiments, the backing plate includes a recessed cavity dimensioned to house the components of the device, such as the light source and power source. The switch, power source, and light source are stacked vertically and then mounted onto the recessed cavity of the backing plate. This compact shape can be easily hidden underneath the bottle as it fits within the recessed portion of the bottom of the bottle.

In some embodiments the device and all components may be completely encased in plastic. By doing this the device itself is made waterproof and can eliminate the need for a backing plate with a water tight seal. The plastic encasement can also be made opaque or frosted. This aids in the scattering of light horizontally. This opaque covering over the light source aids in the illumination effect.

The inventive device may yet further contain radio frequency, infrared or Bluetooth sensors and devices in order for the device to have the ability to be controlled by a remote device or smartphone. The device can also contain a motion sensor such as a tilt or vibration sensor that affects light output. The motion sensors could be used in a myriad of different ways to change the wavelength of the light emitted based upon the movement of the bottle. The ability of device to connect to smartphone or react to the environmental conditions are what may later be referred to as "Smart" features Further the device can also include a temperature sensor circuit. The temperature sensor circuit will be located on the same circuit board as the switch and other electronic components. The temperature sensor can be paired with an RGB LED to automatically alter the wavelength of light based on the ambient temperature or the temperature of the bottle and liquid, thereby changing the hue of the light.

The device can also maintain a so-called switching mechanism. This mechanism can simplify production by making a mechanical switching mechanism. This mechanism works by using a lever that when flipped or turned, pushes down a contact to battery to create a circuit between battery and led.

LEGEND

100: The device
110: The backing plate
112: opening in backing plate
116: Tapered peripheral edge
118: Adhesive
120: A Switch
122: Waterproof Rubber cap
123: Bottle
130: led
169: electronics board with wireless device
140: power source
170: Crevice of bottle
171: Plastic encasement
172: plastic ring
180: oval shaped switching lever
181: Flexible metal bar

DETAILED DESCRIPTION

The present invention provides for a device for illuminating a bottle dimensioned to fit within a concave recess at the bottom of the bottle. The device includes at least a light source, a power source connected to the light source, and a backing plate for providing a water-tight seal and securing the light source and power source within the concave recess at the bottom of the bottle. In some embodiments the backing plate can also be incorporated as part of the plastic encasement of the device.

While several embodiments of the invention are described herein, it is contemplated that considerable variation is possible in the assembly and selection of parts without departing from the spirit of the invention. In the following description and in the claims, parts will be identified by specific names for convenience, but they are intended to be interchangeable with similar parts, as the art will permit.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

Figure 4:
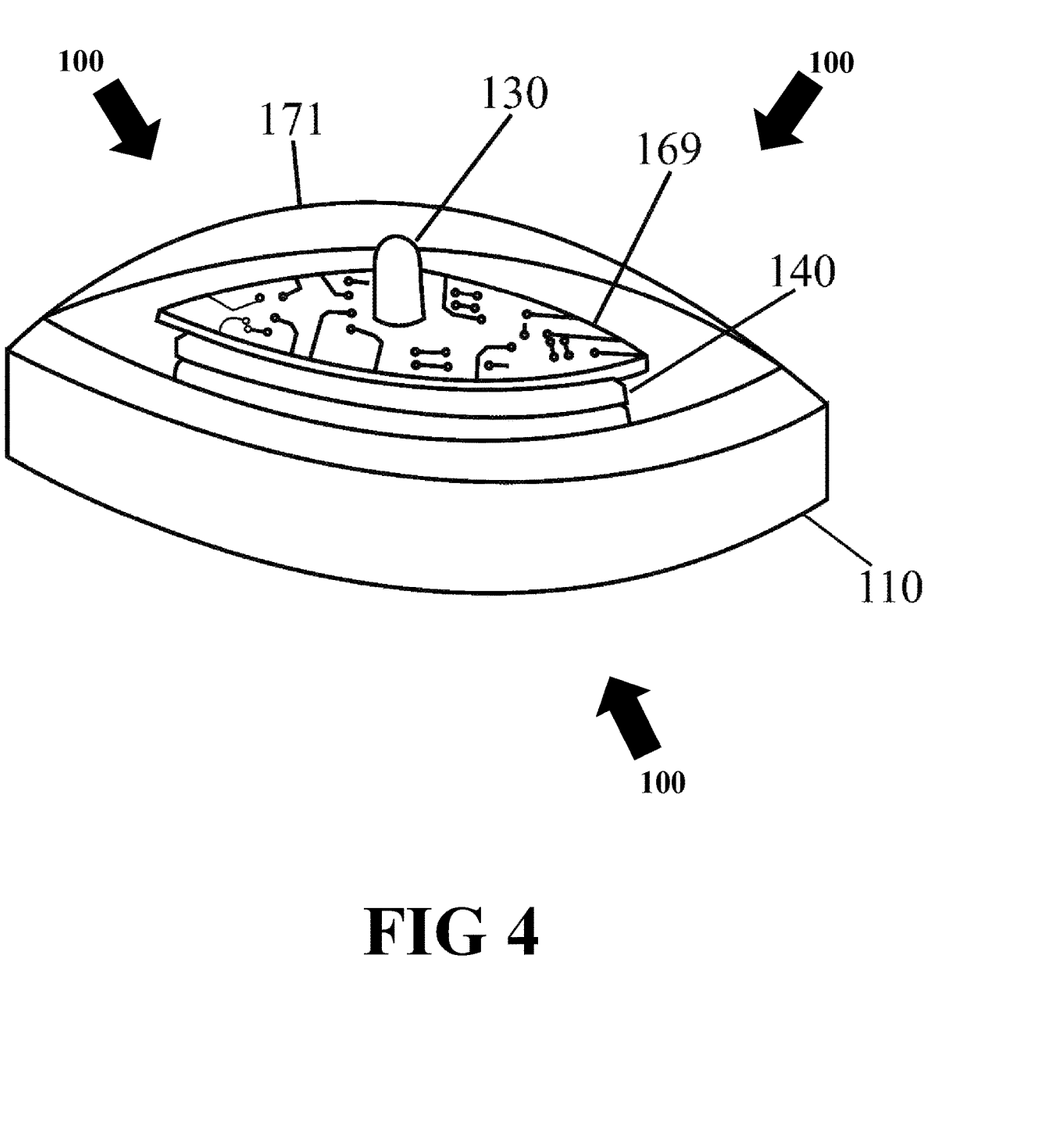
FIG. 4 depicts an elevated perspective view of an embodiment of illumination device with backing plate and plastic encasement. This device incorporates a circuit board with wireless capabilities to provide smartphone control with led being attached to circuit board which is on top of the power source.
Figure 5:
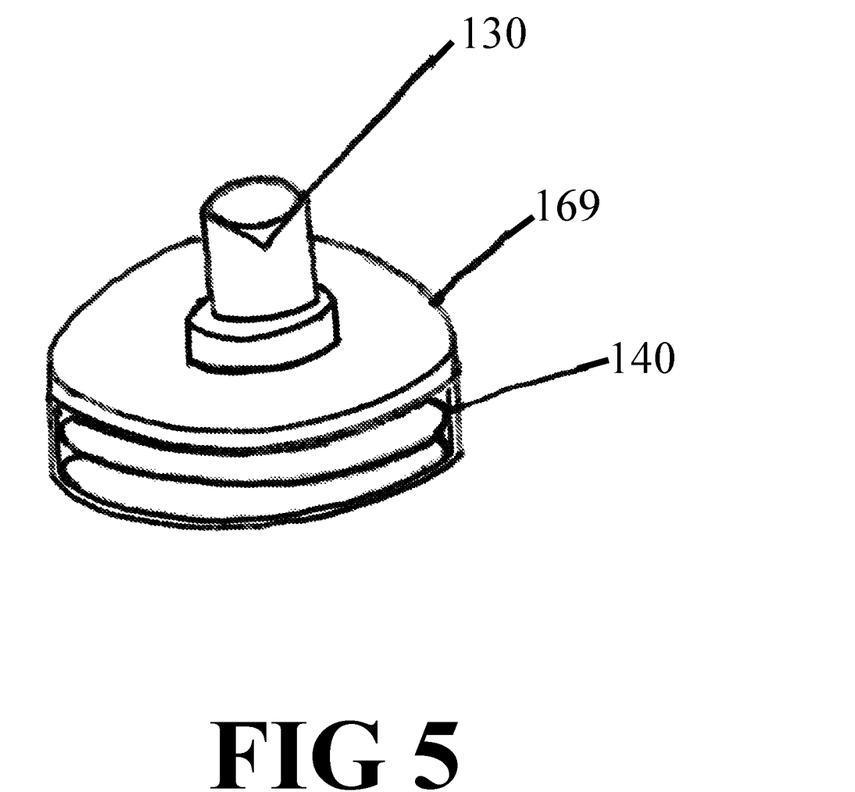
FIG. 5 shows a top view of embodiment of illumination device with the battery, led and device FIG. 6 Shows an expanded side view of a different embodiment of illumination device encased in plastic with switching mechanism.
Figure 6:
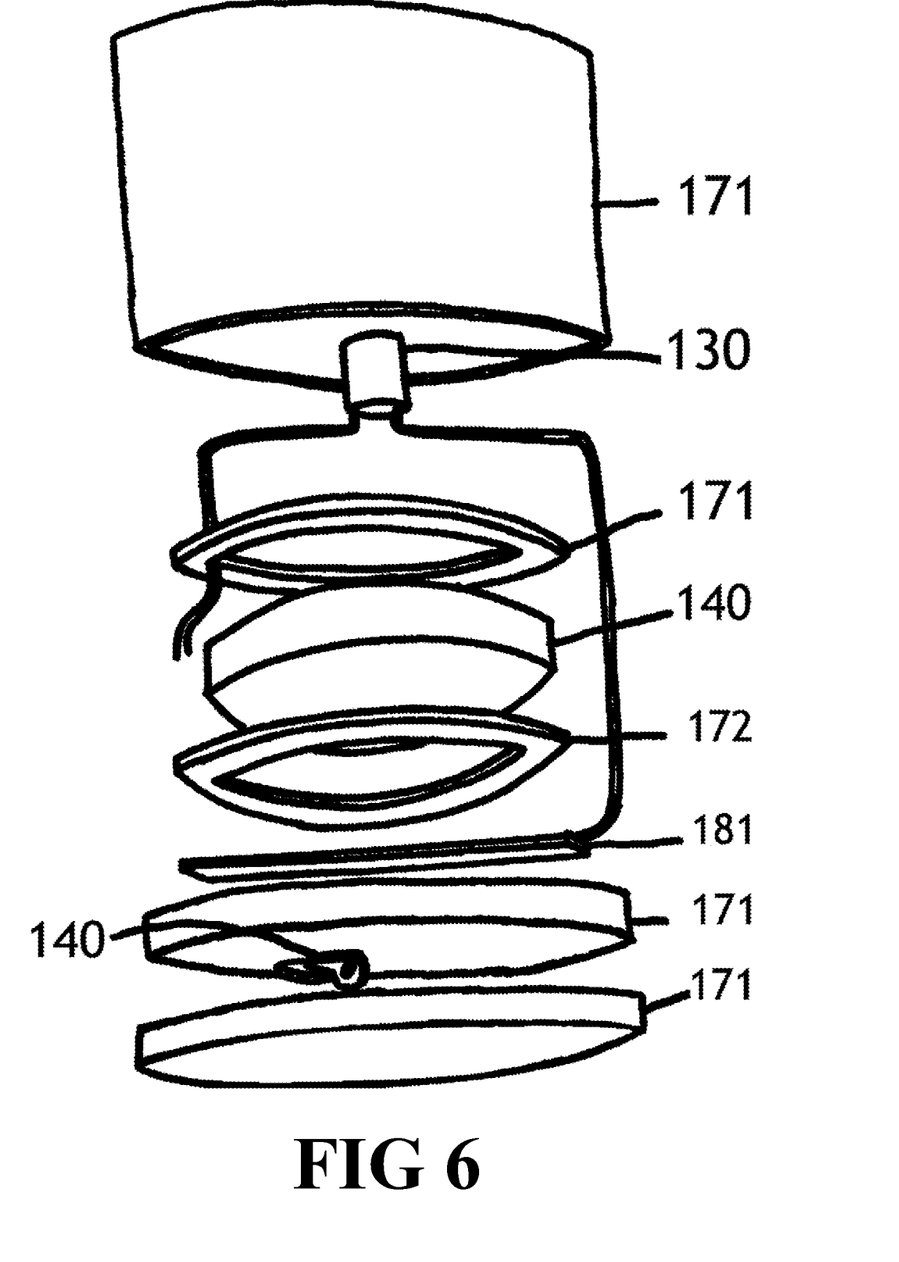
Figure 7:
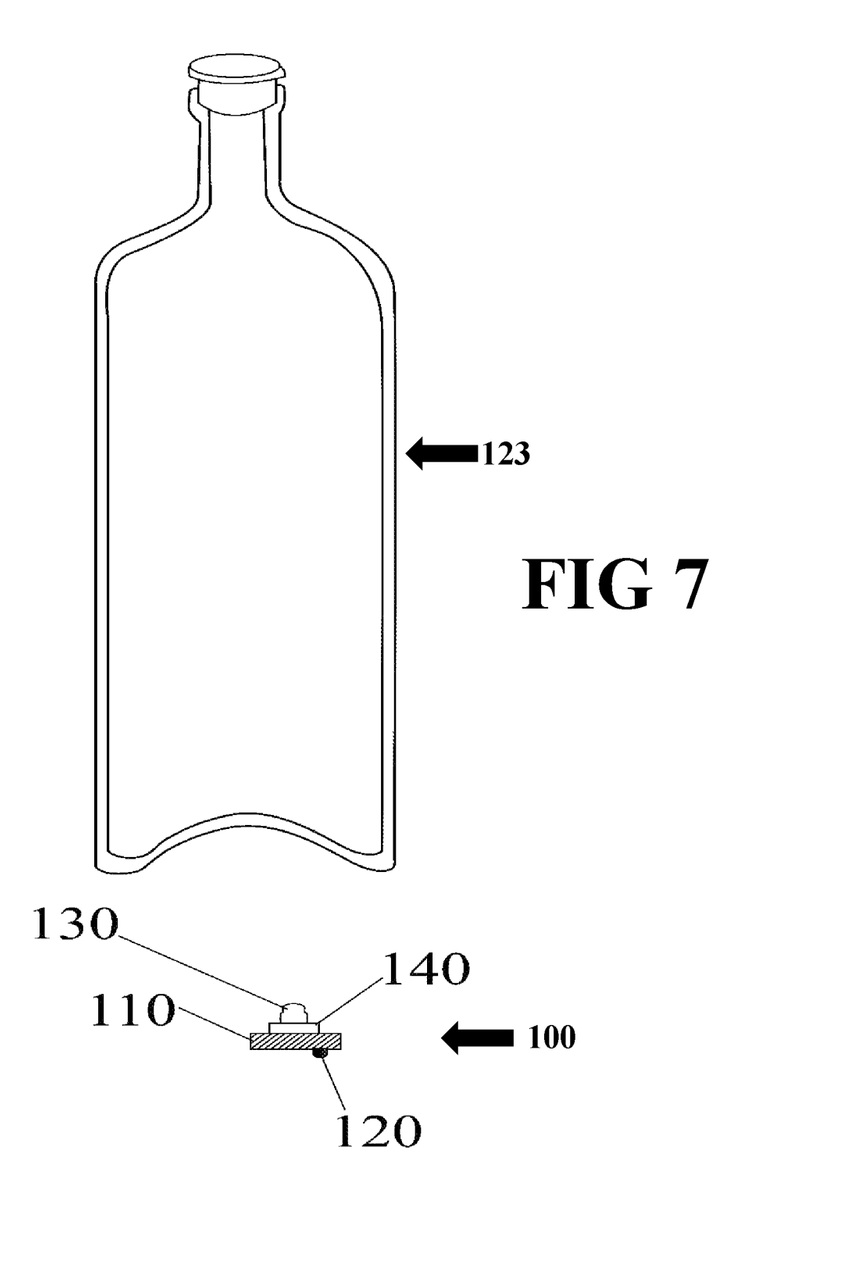
FIG. 7 depicts a perspective view of the bottle with illumination device below
Figure 8:
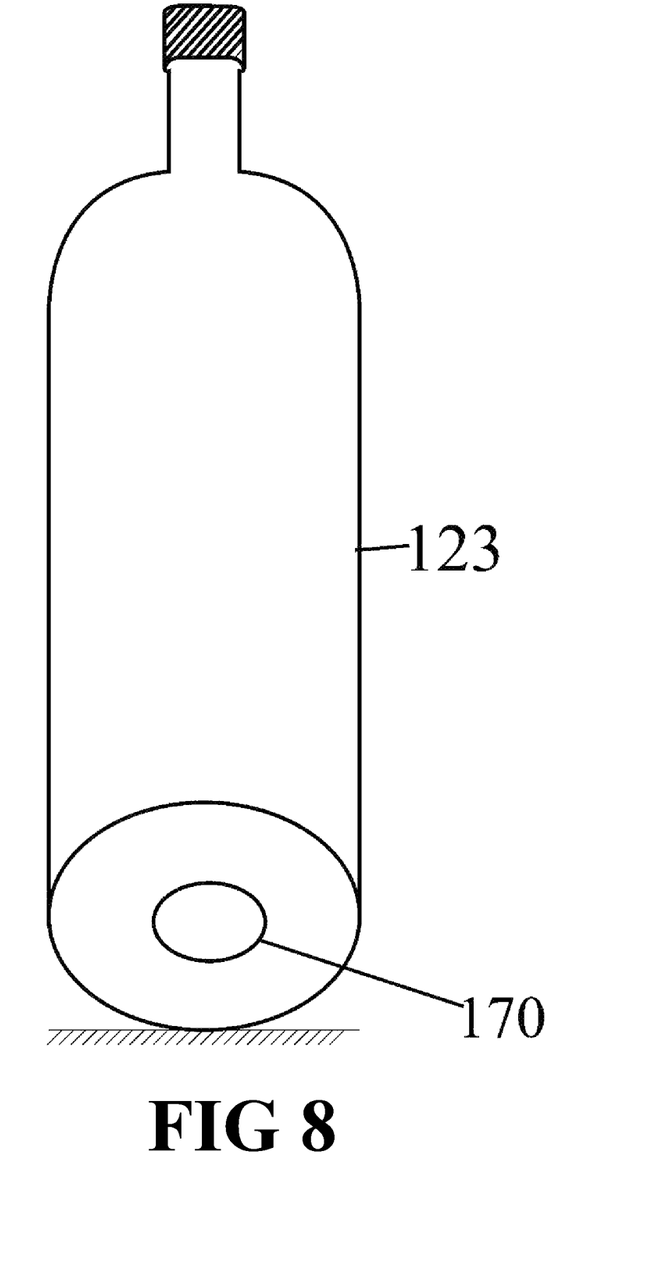
FIG. 8 bottom view of the bottle and bottle crevice without device
Figure 9:
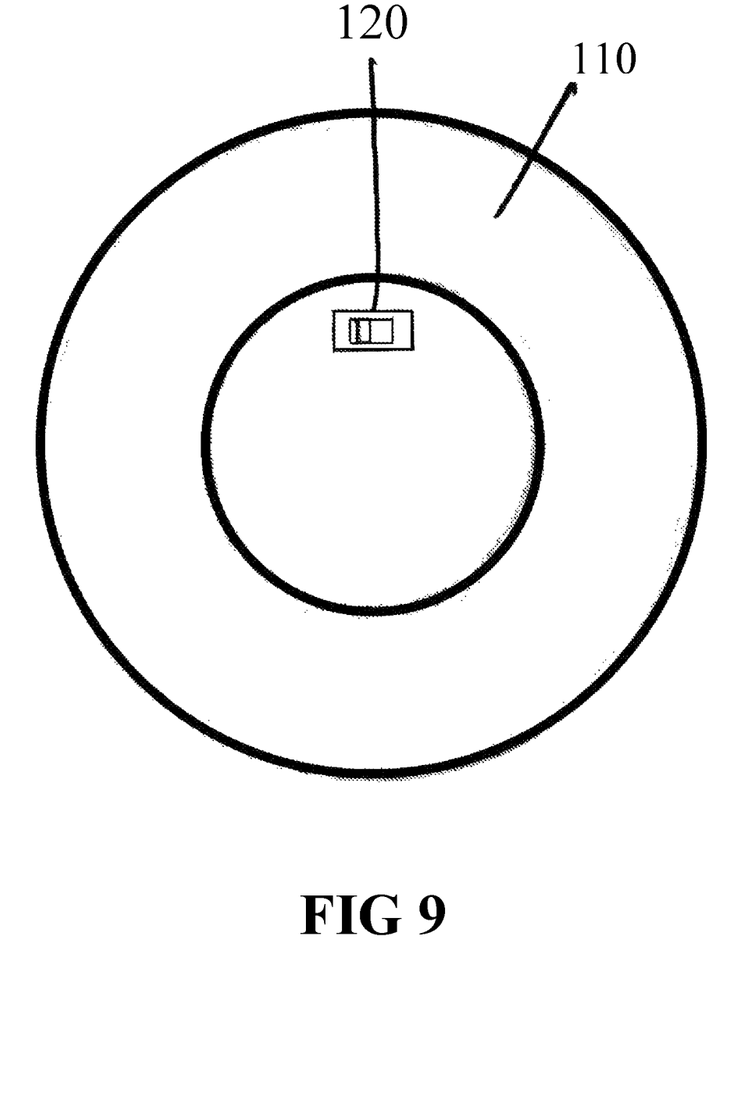
FIG. 9 Bottom view of backing plate with a different switching mechanism
Figure 10:
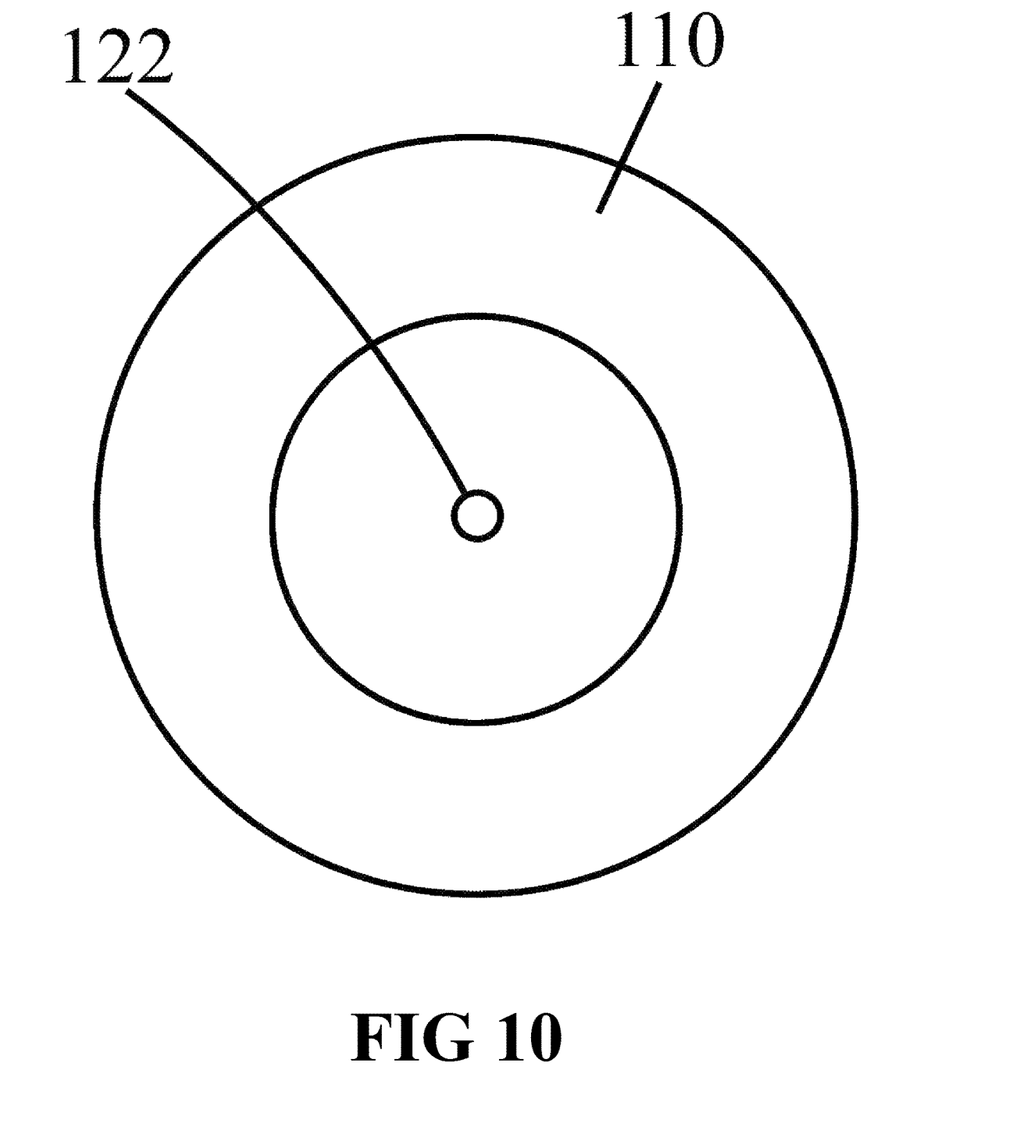
FIG. 10 Bottom view of backing plate with rubber cap to cover switching mechanism with waterproof seal FIG. 11 Cut away side view of bottle with illumination device attached

As represented in the accompanying Figures, the present invention is directed to a compact device for illuminating bottles, generally indicated as 100 in FIG. 4. Certain embodiments, some of which as depicted in FIGS. 5, 6, and 7, the device 100 includes a light source 130, a power source 140, a backing plate 110, and a switch 120 connected to the light source 130, A bottle, 123 and power source 140 for interrupting or connecting the electrical contact between the light source 130 and power source 140.

Backing Plate

Figure 2:
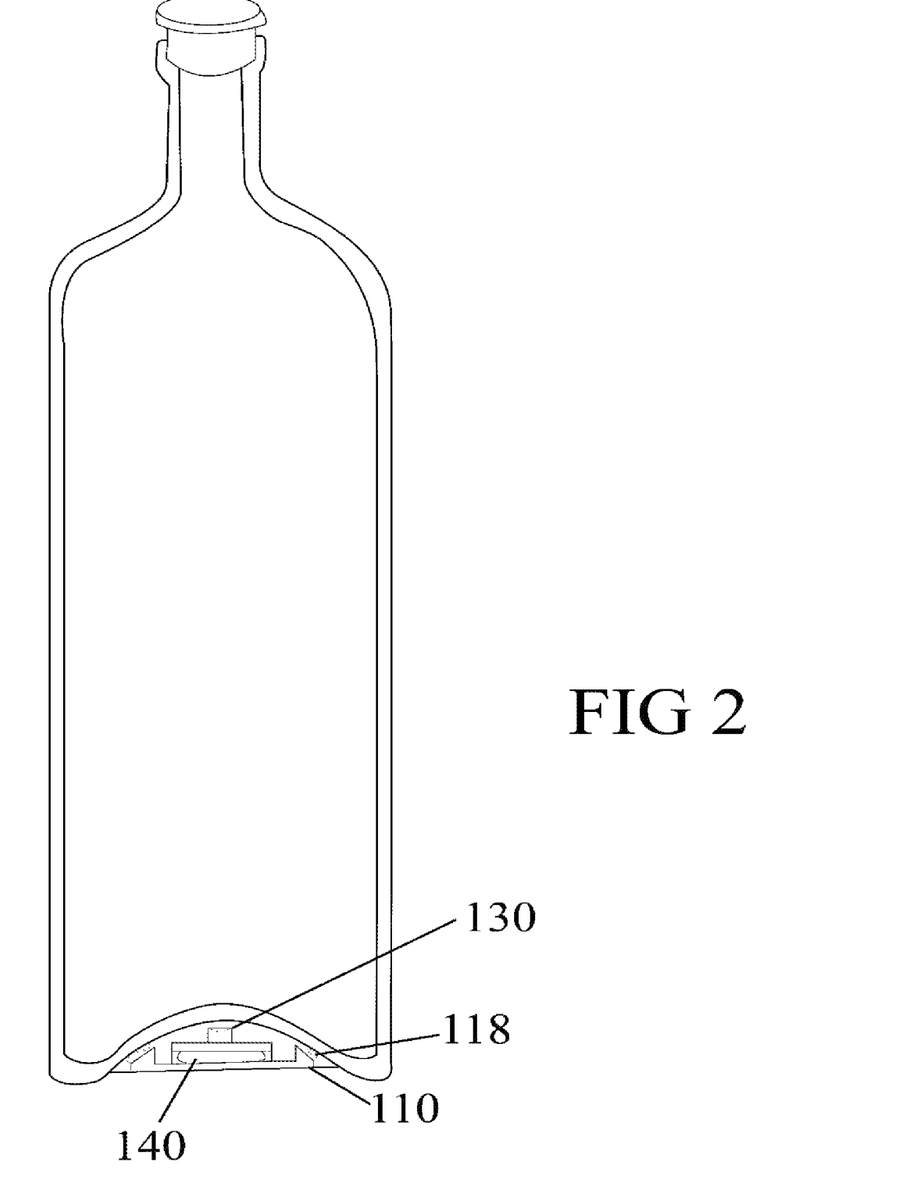
FIG. 2 Depicts a side view of the illumination device and backing plate attached to a bottle.
Figure 3:
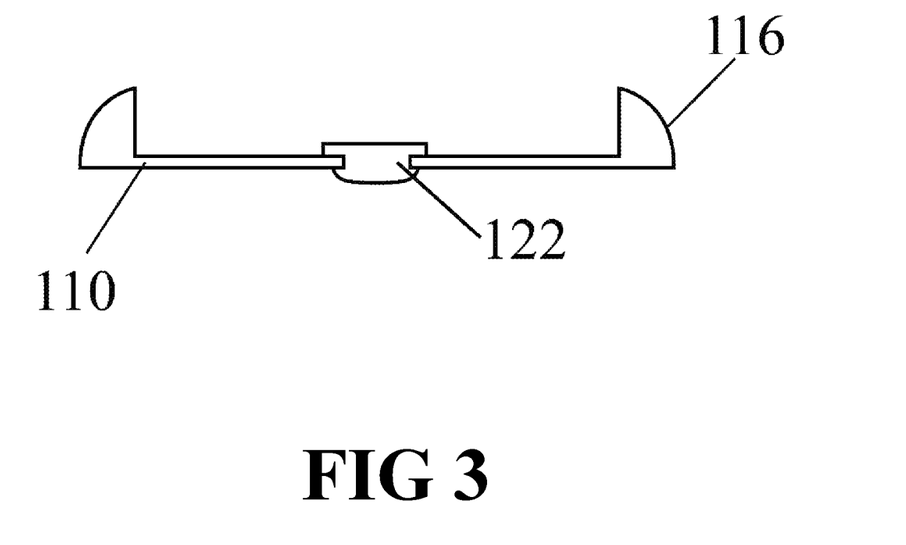
FIG. 3 Depicts a side perspective of the backing plate with tapering sloped edges. With rubber grommet in the center providing water tight cover for switch.

In at least one embodiment, as shown in FIG. 4, the backing plate 110 has a circular shape dimensioned to fit within a concave recess at the bottom of a bottle. The device 100 is circular in shape to follow the curvature of the bottle's concave recess. Bottles, more particularly glass or plastic bottles, are often times manufactured with a concave recess at the bottom of the bottle, commonly referred to as a "punt", in order to strengthen the structure of the bottle making them able to withstand a build up of pressure within. As shown in FIG. 3, the backing plate 110 includes a tapered edge 116 about its periphery that is dimensioned to sit flush against the bottle when the device 100 is placed within the concave recess at the bottom of the bottle. As further illustrated in FIG. 2, the device 100 is designed to be low profile and fit within the concave recess of the bottle, so that the original aesthetic of the bottle is preserved, and the device is not easily seen when not in use and bottle is erect and upright. The bottle is able stand freely without any interference from the device 100.

In at least one embodiment, as shown in FIG. 4, the tapered peripheral edge 116 provides greater surface area thus a better contact with the curved recessed edges of the bottle allowing for a watertight seal to be created between the device 100 and the bottle. An adhesive 118 is deposited on the tapered periphery 116 of the backing plate 110 for sealing the backing plate 110 within the concave recess at the bottom of the bottle. The adhesive 118 permanently and securely attaches the device 100 to the bottle. The angle and shape of the device 100 gives a greater contact patch and surface area for adhesion. This more secure fit provides a better union of bottle and device 100, which in turn provides water resistance. The device 100 is permanently affixed to the bottle or structure, so it provides constant illumination or energy source for the bottle. Since the device 100 is water resistant, the bottle can be submerged in an ice bath or otherwise come in contact with water without damaging the device 100.

As represented in FIG. 6, in at least one embodiment, the device is completely encased in plastic which provides greater water resistance. The device has all components stacked in a vertical arrangement providing for a more compact size. A vertical breakdown of components as shown in FIG. 6. The top of device has a plastic covering 171. Below the covering is the light source or Led 130. Below the Led is a nonconductive material 172, usually plastic, in the shape of a ring. One leg of the led is routed underneath the ring to make contact with the top of battery 140. Then the other leg of led is routed outside the plastic ring 172 The light source sits directly on top of the battery 140. The one leg of the led is routed outside the plastic ring 172, which prevents it from contacting the top of battery. Another plastic ring 172 is glued to the bottom of the battery 140, thus creating a ridge. The other leg of led is connected to a flexible conductive metal bar or wire 181, Which rest on the ridge created by the plastic ring 172. Underneath the bar 181, are two more pieces of plastic 171 Which encase a half oval shaped lever 180. The plastic encasing the lever 180, on the bottom will be cut out as to allow the lever 180 to rotate. All the pieces of plastic 171 will be fused together sandwiching components together in a waterproof case. With one side of the lever 180, being flat, and the other side rounded. When the lever 180 is rotated it pushes against the flexible metal bar 181, forcing it to make contact with the bottom of battery. Thus, creating a circuit and turning on the Led light source.

Figure 1:
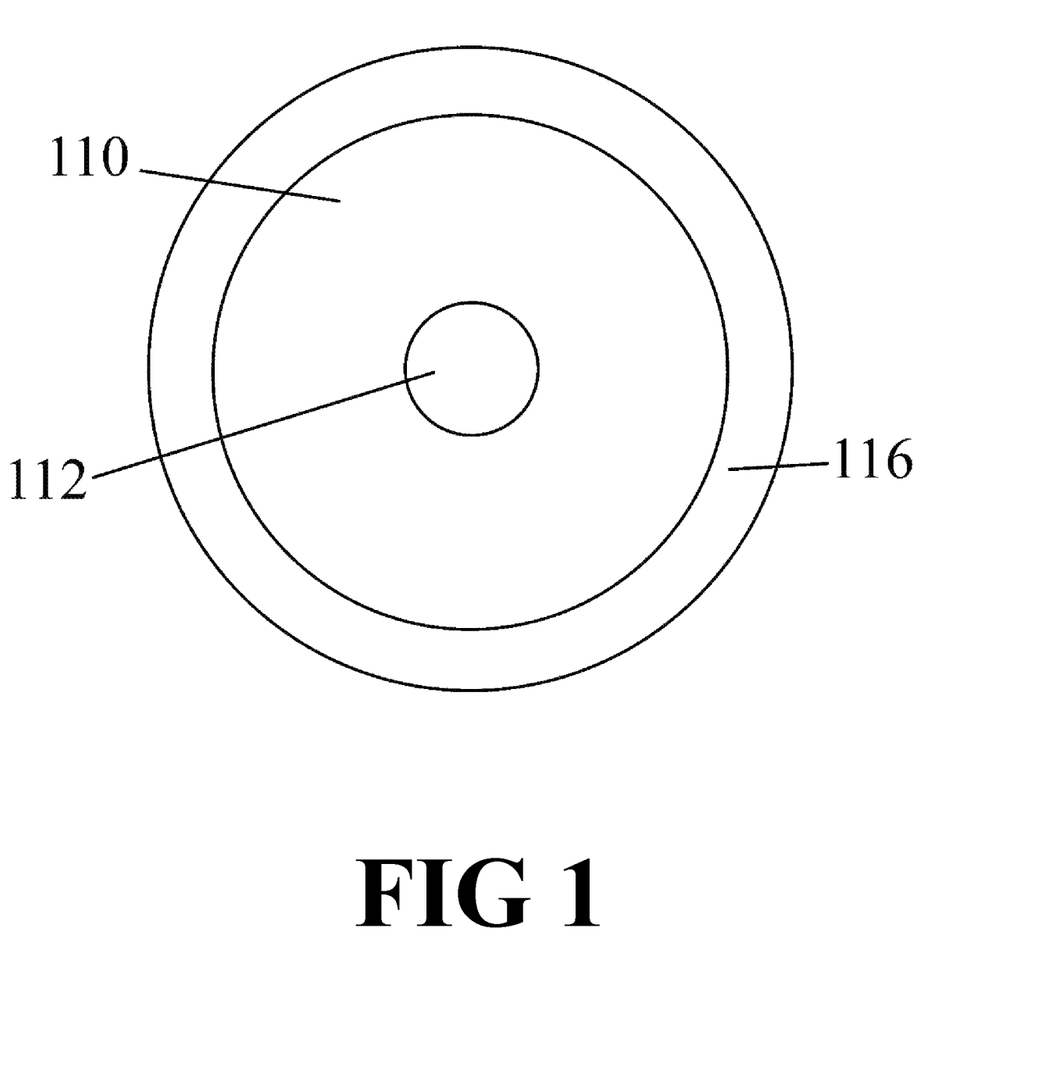
FIG. 1 Shows a top view of the backing plate with a hole, for switch and rubber cap.

As represented in FIG. 1, in at least one embodiment, the backing plate 110 comprises an opening 112 dimensioned to house a switch with rubber cap to provide watertight seal. The switch 120 is mounted within the opening 112 so that the switch 120 may be accessed from the bottom of the bottle when the device 100 is mounted onto the bottle. The device 100 may utilize any of a variety of different types of switches 120, including but not limited to, push switches, toggle switches, rotary switches, switching mechanism, or simple plastic pull-tab between the battery terminal connection and light source. Once connected and mounted onto the backing plate 110.

In at least one embodiment where the device 100 is water resistant, a rubber grommet 122 as seen in FIG. 3, is used to ensure that water will not affect the functionality of the switch 120. The rubber grommet 122 is inserted into the opening 112, made on the backing plate 110 for the user to access the switch 120, to provide a watertight seal. The rubber grommet 122 is flexible so as to allow the user to push the switch and maintain functionality. The rubber grommet 122 has a thinner diameter section followed by a larger diameter section to maintain a tight seal with the backing plate 110.

Figure 11:
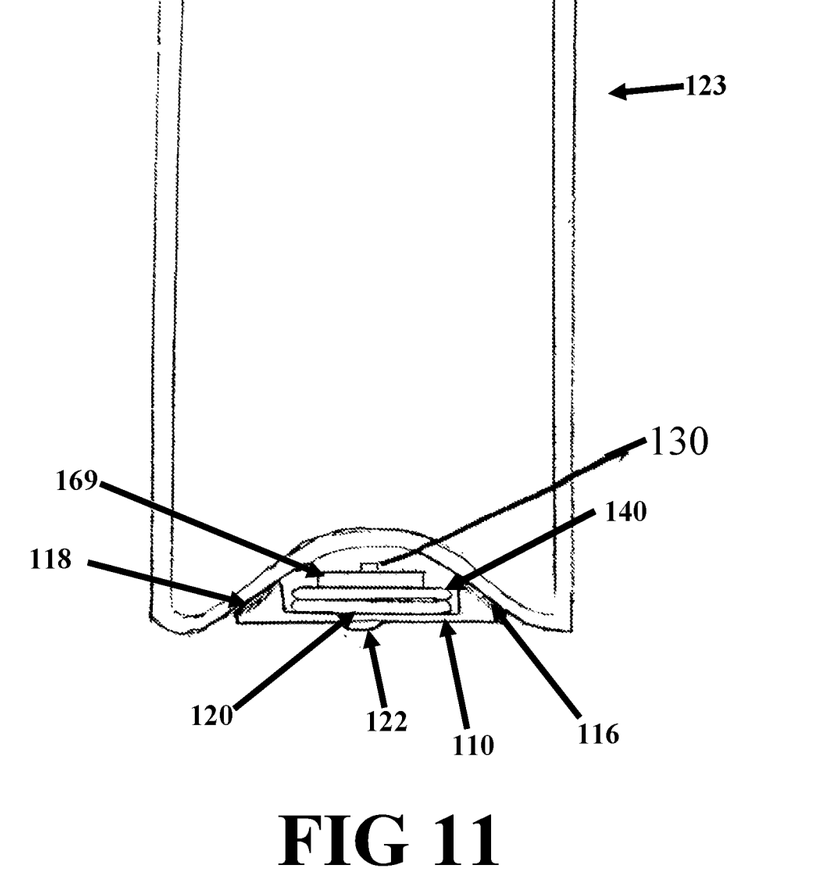

Further, as depicted in FIG. 11, in at least one embodiment the backing plate 110 includes a recessed cavity dimensioned to house the components of the device 100, such as the light source 130 and power source 140. As shown in FIG. 4, FIG. 7 and FIG. 11, the switch 120, power source 140, and light source 130 are stacked vertically and then mounted onto the recessed cavity of the backing plate 110. The power source 140 can be attached to the backing plate 110 using adhesive, a retainer clip or other restraint, and the power source 140 will then be connected to a light source 130 that sits on top of the power source 140. This vertical stacked arrangement of the components of the device 100 allows the device 100 to be more slim and compact. This compact shape can be easily hidden underneath the bottle as it fits within the recessed portion of the bottom of the bottle.

Light Source and Power Source

The present invention includes a light source 130 connected to a power source 140. At least one embodiment of the arrangement is depicted in FIG. 5. The light source 130 may utilize any or a combination of several of a variety of different types of light sources 130, including but not limited to, LED, ultraviolet, incandescent, and chemical illumination sources. In at least one embodiment, an LED light or an SMD LED may be used as the light source 130 in the device 100. The LED lights are domed shaped while SMD LED lights are more compact. The shape of regular LEDs can also be modified to provide more scattered light dispersion to aid visual effects, for example, the surface may be scuffed and the top flattened to provide a better horizontal diffusion of light. The led might also have a Fresnel cap to aid in light dispersion. As previously mentioned the device may also be incased in plastic. This plastic may have an opaque appearance or groves to aid in light dispersion.

The device 100 may emit energy in the form of visible light but is not limited only to visible light. The device 100 may also emit ultraviolet light, which alone is not visible to the human eye. In some embodiments, the device 100 utilizes an ultraviolet light sources, which illuminates and excites a luminescent substance that can be within the bottle itself or within the liquid inside the bottle. The ultraviolet light source 130 would cause a visible glowing luminescent effect within the bottle.

Further, in at least one embodiment, the device 100 may use RGB (Red, Green, Blue) color changing LED lights. These RGB led's be Self-changing meaning the color of light changes automatically without user interaction. RGB LED light sources combine the colors red, green, and blue to produce over 16 million hues of light. LED light sources may be configured to provide continuous illumination, intermittent illumination, or any combination thereof at varying speeds. RGB LED light sources may additionally be configured to produce multi-color changes. Using an RGB LED light source with built-in color changing modes reduces production cost, effort, complexity and number of components. It is appreciated that a combination of light sources may be used in a single embodiment, therefore, nothing herein is intended to limit the light source to one specific light source.

Without being bound to a particular theory, the device 100 is placed in the concave recess at the bottom of the bottle because the light is dispersed more effectively in this way creating a more visible glowing effect when viewing the bottle from a horizontal vantage point. This method also reduces product complexity and product cost. The device 100 increases the visual appeal of the bottle making it more attractive to consumers and for display purposes, dramatic effect, brand discernibility, and marketing applications. The device 100 also enhances product visibility so the bottle will be more easily seen and found when in dimly lit areas.

As depicted in FIG. 4 and FIG. 6, the device 100 is designed to work with any transparent, semi-transparent, frosted, or translucent bottles. The device 100 is compatible with any bottles having a concave recess at the bottom of the bottle that are made of glass, plastic, or any other hard translucent material. The device as shown in FIG. 4 and FIG. 6, can be encased in plastic 171, With the plastic being opaque or frosted appearance to aid in light dispersion. This scattering of light provides more horizontally oriented light rays. This allows the bottle when viewed at the side from a distance to have a greater illuminating effect. The device 100 is capable of illuminating the bottle as well as being used in conjunction with any metallic flakes inside the bottle, such as gold and platinum, used to enhance the aesthetics of the bottle and the liquid within. The illumination from the device 100 reflects off of the metallic particles causing a glimmering effect that enhances the appearance and their visibility.

In some embodiments, the device 100 provides portable illumination for the bottle by using an internal power source 140. FIGS. 2, 5, 6, 7 and 11 illustrate certain embodiments relating to this configuration. The device 100 may utilize any or a combination of several of a variety of different types of power sources, including but not limited to, batteries, capacitors or a combination thereof. FIG. 5 and FIG. 6, illustrates examples of embodiments of the invention where the device utilizes a battery to power the device 100 without need for external power sources. The device provides stand-alone illumination of the bottle for display purposes, dramatic effect, novelty, and marketing applications. In other embodiments the device 100 could also contain a rechargeable power source. Other embodiments of the device could contain a copper coil attached to either side of the backing plate 110 allowing for wireless charging of the battery through the use of electromagnetic inductive or non-radiative charging.

Other Elements

In at least one embodiment seen in FIG. 4, the device 100 can also contain radio frequency, infrared or Bluetooth sensors on an electronics board 169 in order for the device 100 to have the ability to be controlled by a remote device or smartphone. This gives the user control over the device 100 which includes but not limited to, the ability to change the color, lighting display modes, and to turn the device 100 on and off, which can eliminate the need for a power switch 120.

The device can contain necessary and common electronic components for the ability of wireless connectivity with smartphone. These components would be mounted on the electronics board 169. The device 100 can be controlled via smartphone. The smartphone can give the user the ability to control many features of the device, including but not limited to the color of light and intensity of light. When used in conjunction with a smartphone the device 100 could have so called "Smart features" which utilizes the smartphone microphone to listen to ambient noise and use this to adjust intensity and color of light. An example would be the light changing color or flashing with the different intensity of sound in music.

In some embodiments, the device 100 includes a temperature sensor circuit. The temperature sensor circuit will be located on the same circuit board 169 as the led or switch 120 and other electronic components. The temperature sensor can be paired with an RGB LED to automatically alter the wavelength of light based on the ambient temperature thereby changing the hue of the light. If the bottle is chilled or placed in a cold ice bath the wavelength of light will be different than if the bottle was in a warm environment. This effect of color change with temperature can be an additional marketing novelty feature of the device 100.

Further, in at least one embodiment, the device 100 can also contain a motion sensor on a electronics board 160 such as a tilt or vibration sensor that affects light output. The motion sensors 160 could be used in a myriad of different ways to change the wavelength of the light emitted using an RGB LED light based upon the movement of the bottle. For example, if the device is shaken this could cause the light source to have a strobe lighting effect or a color changing effect. Additionally, if the device is tilted as one pours liquid from the bottle, the color of the light source could change or cause a strobe lighting effect while the device is tilted.

Another feature of one or more embodiments is the use of a pressure switch. The pressure switch is positioned within the concave recess of the bottom of the bottle in a position where the switch 120 is opened upon lifting the bottle from a surface and the switch 120 is later closed upon setting the bottle down on a surface or vice-versa depending on the configuration of the switch 120. When the switch 120 is closed, the switch 120 is supplying power from the power source 140 to the light source 130 causing the device 100 to illuminate automatically.

Other Embodiments

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A device for illuminating conventional bottles dimensioned to fit within a concave recess at a bottom of the conventional bottle, comprising:
   a light source;
   a power source;
   a switching mechanism to provide or disrupt electrical power;
   a substantially horizontal backing plate having a concave recess and a tapered edge securing said device to the concave recess at the bottom of the conventional bottle;
   an adhesive connecting the device to the conventional bottle; and
   the device is encased in plastic having opaque properties to assist in dispersion of light.

2. The device of claim 1, further comprising:
   a switch with rubber covering to provide waterproof seal.

3. The device of claim 1, further comprising:
   the backing plate comprises an opening dimensioned to house the switch.

4. The device of claim 1, further comprising:
   locating an automatic color changing LED within the backing plate.

5. The device of claim 1, wherein said wireless technology is incorporated to allow wireless control of said device.

6. The device of claim 1, further comprising:
wherein the backing plate includes a recessed cavity dimensioned to house said power source and the light source.

7. The device of claim 1, in which said device is partially or completely encased in plastic or silicone to waterproof the device.

8. The device in claim 1, in which said device alters wavelength of light source due to sound or music.

9. The device of claim 1, wherein the light source is selected from the group consisting of incandescent and chemical illumination sources.

10. The device of claim 1, further comprising a radio frequency, infrared or Bluetooth sensor, whereby the device can be controlled using a remote device or smartphone.

11. The device of claim 1, further comprising:
a temperature sensor located at the bottom of the device, the temperature sensor paired with an RGB LED to automatically alter the wavelength of the light emitted by the RGB LED based on the ambient temperature or the temperature of the bottle and liquid.

12. The device of claim 1, further comprising:
a motion sensor paired with an RGB LED to automatically alter the wavelength of the light emitted by the RGB LED based on the movement of the bottle.

13. A lighting device contained on the bottom of a pre-existing bottle or container comprising:
a light source;
a power source;
a substantially horizontal backing plate having a concave recess and a tapered edge securing said device to the concave recess at the bottom of the conventional bottle;
a switching mechanism to allow or disrupt flow of electricity; and
one or more Bluetooth or other wireless electronic components allowing for wireless control of the light source.

14. The device of claim 13, in which the device can wirelessly connect via a smartphone.

15. The device of claim 13, in which the device contains a rechargeable battery.

16. The device of claim 13, further comprising:
the lighting device is permanently affixed to the bottle by the purchaser of the lighting device.

17. The device of claim 13, further comprising:
a backing plate which is circular and has a tapered periphery dimensioned to sit flush against the bottle when the lighting device is placed within a concave recess at the bottom of the bottle.

18. The device of claim 13, further comprising:
a temperature sensor located at the bottom of the device, the temperature sensor paired with an RGB LED to automatically alter the wavelength of the light emitted by said RGB LED based on the ambient temperature or the temperature of the bottle and liquid.

19. A device for illuminating pre-existing bottles from the bottom comprising:
the device is completely encased in plastic or silicone to thereby waterproof the device;
a light source;
a power source;
a substantially horizontal backing plate having a concave recess and a tapered edge securing said device to the concave recess at the bottom of the conventional bottle;
an adhesive to affix said device to the bottle.

20. The device of claim 1, further comprising
the device is low profile and fits within the concave recess of the conventional bottle, so that the original aesthetic of the bottle is preserved.

21. The device of claim 1, further comprising
the device is concealed and unseen when not in use and bottle is erect and upright.

22. The device of claim 1, further comprising
the bottle is able stand freely without any interference from the device.

23. The device of claim 1, further comprising
a tapered peripheral edge providing a surface area sufficient to maximize contact with one or more curved recessed edges of the bottle, thereby facilitating a watertight seal between the device and the bottle.

* * * * *